(12) United States Patent
Shao et al.

(10) Patent No.: US 12,197,189 B2
(45) Date of Patent: Jan. 14, 2025

(54) METHODS FOR CONTROLLING NATURAL GAS EFFICIENCY ENHANCEMENT, SMART GAS INTERNET OF THINGS (IOT) SYSTEMS AND MEDIUMS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 232 days.

(21) Appl. No.: 18/061,485

(22) Filed: Dec. 5, 2022

(65) Prior Publication Data

US 2023/0101197 A1 Mar. 30, 2023

(30) Foreign Application Priority Data

Nov. 8, 2022 (CN) .......................... 202211388217.5

(51) Int. Cl.
*G16Y 40/30* (2020.01)
*G05B 19/4155* (2006.01)

(52) U.S. Cl.
CPC .................. *G05B 19/4155* (2013.01); *G05B 2219/41108* (2013.01); *G16Y 40/30* (2020.01)

(58) Field of Classification Search
CPC ...... G05B 19/4155; G05B 2219/41108; G16Y 10/35; G16Y 40/30; G06Q 10/04; G06Q 10/06; G06Q 50/06; H04L 67/12
See application file for complete search history.

(56) References Cited

U.S. PATENT DOCUMENTS 10,616,667 B1 *   4/2020   Shao .................... G06F 16/903
10,753,677 B2 *   8/2020   Suraganda Narayana ...............
                                                    F25J 1/0252

(Continued)

FOREIGN PATENT DOCUMENTS

CN       104949725 A      9/2015
CN       109285099 A      1/2019

(Continued)

OTHER PUBLICATIONS

Liu, Bing, New Exploration to "Internet+" Smart Energy—Investigation on F2C Point of Liquefied Natural Gas, China Opening Journal, 194: 24-28, 2017.

(Continued)

*Primary Examiner* — M. N. Von Buhr
(74) *Attorney, Agent, or Firm* — METIS IP LLC

(57) ABSTRACT

The embodiments of the present disclosure provide methods for controlling natural gas efficiency enhancement of smart gas, smart gas Internet of Things (IoT) systems and mediums. The method may comprise obtaining at least one user need through a smart gas user platform based on a smart gas service platform, the user need including a gas usage target need; determining at least one optimization objective based on the at least one user need; determining a target proportioning feature of a synergist according to the at least one optimization objective, the target proportioning feature including a proportioning vector and an addition proportion of the synergist; and configuring a target synergist that satisfies the target proportioning feature to enhance efficiency of natural gas by sending the target proportioning feature to a smart gas object platform through a smart gas sensor network platform.

8 Claims, 5 Drawing Sheets

(56) References Cited

U.S. PATENT DOCUMENTS

| | | | |
|---|---|---|---|
| 11,796,368 B2* | 10/2023 | Shao | G16Y 20/30 |
| 11,979,697 B2* | 5/2024 | Shao | H04Q 9/02 |
| 2018/0356151 A1 | 12/2018 | Suraganda Narayana et al. | |
| 2020/0302559 A1 | 9/2020 | Shao | |
| 2022/0163365 A1 | 5/2022 | Shao et al. | |
| 2023/0400341 A1* | 12/2023 | Shao | G01F 15/075 |

FOREIGN PATENT DOCUMENTS

| | | |
|---|---|---|
| CN | 110163765 A | 8/2019 |
| CN | 110175788 A | 8/2019 |
| CN | 110225075 A | 9/2019 |
| CN | 111432016 A | 7/2020 |
| CN | 112241924 A | 1/2021 |
| CN | 112882403 A | 6/2021 |
| CN | 113077101 A | 7/2021 |
| CN | 113965591 A | 1/2022 |
| CN | 114352947 A | 4/2022 |
| CN | 114548665 A | 5/2022 |
| CN | 114626643 A | 6/2022 |
| WO | 2018152701 A1 | 8/2018 |

OTHER PUBLICATIONS

Liang, Jinfeng et al., Management of Indoor Gas Safety based on the NB-IoT Gas Meter, 2021 33rd Chinese Control and Decision Conference (CCDC), 2776-2780, 2021.
First Office Action in Chinese Application No. 202211388217.5 mailed on Apr. 22, 2024, 13 pages.
Notification to Grant Patent Right for Invention in Chinese Application No. 202211388217.5 mailed on May 20, 2024, 4 pages.
First Office Action in Chinese Application No. 202211388217.5 mailed on Apr. 22, 2024, 11 pages.

* cited by examiner

300

┌─────────────────────────────────────────────┐
│ For each optimization objective of the at least one │
│ optimization objective, determining a user satisfaction │─ 310
│ degree of each user need of the at least one user need to │
│ the optimization objective │
└─────────────────────────────────────────────┘
                      ↓
┌─────────────────────────────────────────────┐
│ Determining a total satisfaction degree of the optimization │
│ objective according to each user satisfaction degree │─ 320
│ corresponding to the optimization objective │
└─────────────────────────────────────────────┘
                      ↓
┌─────────────────────────────────────────────┐
│ Determining a final optimization objective according to the │─ 330
│ total satisfaction degree of each optimization objective │
└─────────────────────────────────────────────┘
                      ↓
┌─────────────────────────────────────────────┐
│ Determining the target proportioning feature according to the │─ 340
│ final optimization objective │
└─────────────────────────────────────────────┘

FIG. 3

METHODS FOR CONTROLLING NATURAL GAS EFFICIENCY ENHANCEMENT, SMART GAS INTERNET OF THINGS (IOT) SYSTEMS AND MEDIUMS THEREOF

CROSS-REFERENCE TO RELATED APPLICATIONS

This application claims priority of Chinese Patent Application No. 202211388217.5, filed on Nov. 8, 2022, the entire contents of which are hereby incorporated by reference.

TECHNICAL FIELD

The present disclosure relates to the field of smart gas, and in particular to methods for controlling natural gas efficiency enhancement of smart gas, smart gas Internet of Things (IoT) systems and mediums.

BACKGROUND

Natural gas efficiency enhancement generally refers to controlling performance parameters of natural gas such as combustion temperature, energy consumption, and exhaust gas through synergists, natural gas parameter adjustment and other technical means. As natural gas is used more and more widely, different users may have different use needs for natural gas. How to reasonably control the efficiency enhancement of natural gas to meet the use needs of each user has become an urgent technical problem to be solved in the field.

SUMMARY

One or more embodiments of the present disclosure provide a method for controlling natural gas efficiency enhancement of smart gas, realized based on a smart gas Internet of Things (IoT) system. The smart gas IoT system may comprise a smart gas user platform, a smart gas service platform, a smart gas equipment management platform, a smart gas sensor network platform, and a smart gas object platform. The method may be implemented by the smart gas equipment management platform. The method may comprise: obtaining at least one user need through the smart gas user platform based on the smart gas service platform, the user need including a gas consumption need and a gas usage target need; determining at least one optimization objective based on the at least one user need; determining a target proportioning feature of a synergist according to the at least one optimization objective, the target proportioning feature including a proportioning vector and an addition proportion of the synergist; and configuring a target synergist that satisfies the target proportioning feature to enhance the efficiency of natural gas by sending the target proportioning feature to the smart gas object platform through the smart gas sensor network platform.

One or more embodiments of the present disclosure provide a smart gas Internet of Things (IoT) system for controlling natural gas efficiency enhancement of smart gas. The smart gas IoT system may comprise a smart gas user platform, a smart gas service platform, a smart gas equipment management platform, a smart gas sensor network platform and a smart gas object platform. The smart gas equipment management platform may be configured to: obtain at least one user need through the smart gas user platform based on the smart gas service platform, the user need including a gas consumption need and a gas usage target need; determine at least one optimization objective based on the at least one user need; determine a target proportioning feature of a synergist according to the at least one optimization objective, the target proportioning feature including a proportioning vector and an addition proportion of the synergist; and configure a target synergist that satisfies the target proportioning feature to enhance the efficiency of natural gas by sending the target proportioning feature to the smart gas object platform through the smart gas sensor network platform.

One or more embodiments of the present disclosure provide a non-transitory computer-readable storage medium storing computer instructions. When the computer instructions are executed by a processor, the method for controlling natural gas efficiency enhancement of smart gas may be implemented.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 3 is a flowchart illustrating an exemplary process for determining a target proportioning feature of a synergist according to some embodiments of the present disclosure;

DETAILED DESCRIPTION

Figure 1:
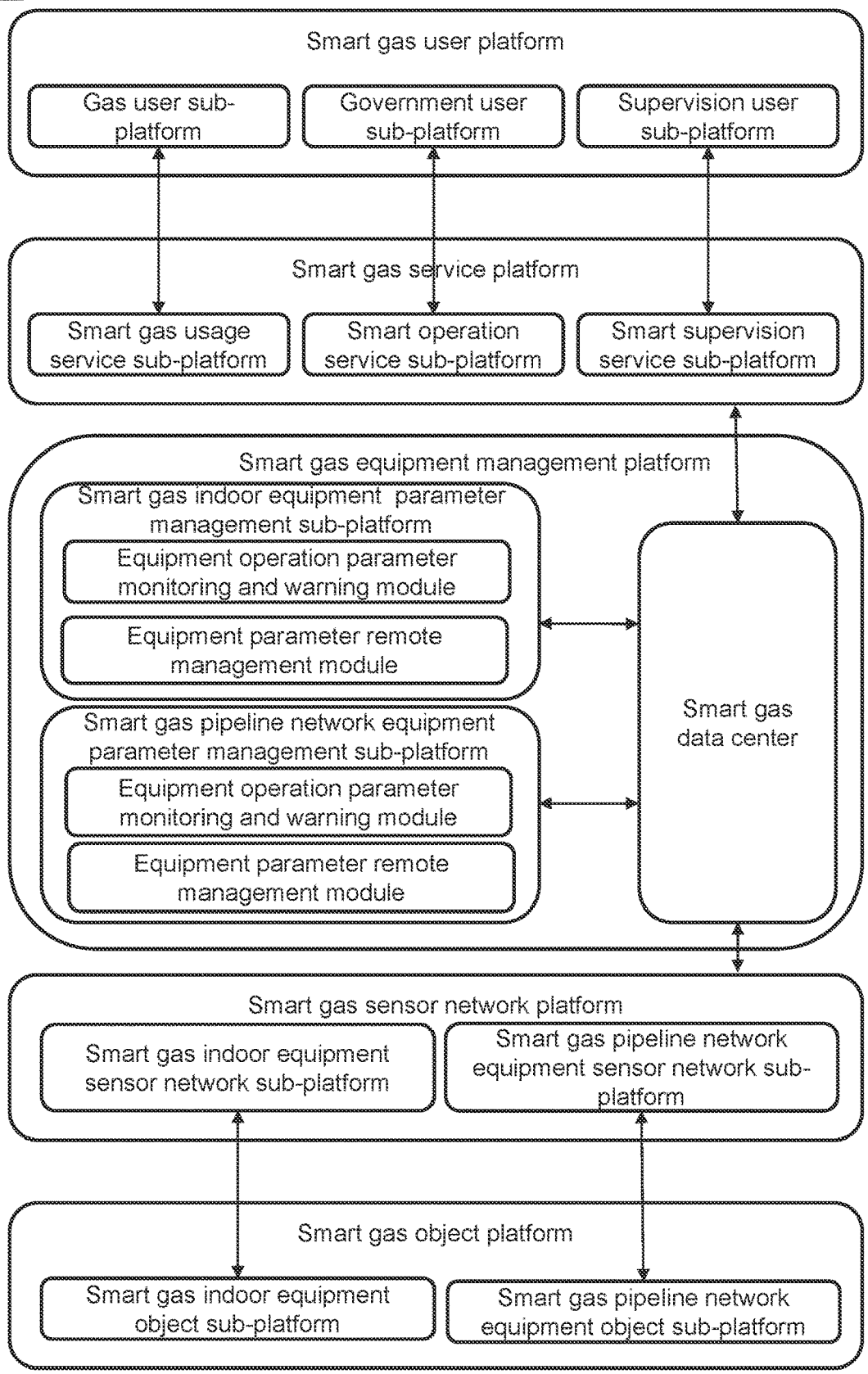
FIG. 1 is a schematic diagram illustrating a smart gas Internet of Things (IoT) system according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating a smart gas Internet of Things (IoT) system according to some embodiments of the present disclosure.

As shown in FIG. 1, the smart gas IoT system 100 may include a smart gas user platform, a smart gas service platform, a smart gas equipment management platform, a smart gas sensor network platform, and a smart gas object platform that interact in sequence. The smart gas user platform, the smart gas service platform, the smart gas equipment management platform, the smart gas sensor network platform, and the smart gas object platform may realize interaction through sequential communication and connection.

The smart gas user platform may be configured as a terminal device, which is used to receive a user need of a gas user and feedback relevant information of smart gas (such as combustion temperature, emission, consumption, etc. of natural gas). The terminal device may include an intelligent electronic device that realizes data processing and data communication such as a desktop computer, a tablet computer, a notebook computer, a mobile phone, etc., which is not limited here. In some embodiments, the smart gas user platform may include a gas user sub-platform and a government user sub-platform, so that both the gas user and a government user may receive information transmitted by the smart gas service platform.

In some embodiments, the gas user sub-platform may be a user platform used by the gas user (e.g., an industrial gas user, a commercial gas user, an ordinary gas user, etc.), and may upload the user need of the gas user. In some embodiments, the gas user sub-platform may correspond to and interact with a smart gas usage service sub-platform to obtain services for safe gas use.

In some embodiments, the government user sub-platform may be a user platform used by the government user (such as an environmental protection bureau, a gas bureau, etc.), and may obtain operation parameters of each equipment in the smart gas IoT system 100 to implement supervision of the smart gas IoT system 100. In some embodiments, the government user sub-platform may correspond to and interact with a smart operation service sub-platform to obtain services for gas operation.

In some embodiments, the smart gas user platform may further include a supervision user sub-platform. The supervision user sub-platform may be a user platform used by a supervision user (such as a natural gas security department), and may be used to supervise operation of the entire IoT system to ensure safety of smart gas use. In some embodiments, the supervision user sub-platform may correspond to and interact with a smart supervision service sub-platform to obtain services for safety supervision.

In some embodiments, the smart gas user platform may interact downward with the smart gas service platform. For example, need information of the gas user may be sent to the smart gas usage service sub-platform through the gas user sub-platform; and synergist usage information uploaded by the smart gas usage service sub-platform may be received. As another example, a gas synergist proportioning scheme may be sent to the smart gas operation service sub-platform through the government user sub-platform; and the gas synergist proportioning scheme uploaded by the smart gas operation service sub-platform may be received.

The smart gas service platform may be used to realize information interaction between the smart gas user platform and the smart gas equipment management platform. For example, the smart gas equipment management platform may send the target proportioning feature of the synergist to the smart gas user platform through the smart gas service platform.

In some embodiments, the smart gas service platform may include the smart gas usage service sub-platform, the smart operation service sub-platform, and the smart supervision service sub-platform. The smart gas usage service sub-platform may correspond to the gas user sub-platform and provide the gas user with relevant information on gas equipment. The smart operation service sub-platform may correspond to the government user sub-platform and provide the government user with relevant information on gas operation. The smart supervision service sub-platform may correspond to the supervision user sub-platform and provide the supervision user with relevant information on safety supervision.

In some embodiments, the smart gas service platform may interact downward with the smart gas equipment management platform. For example, the smart gas service platform may send a gas equipment operation information query instruction to the data center of the equipment management platform and receive gas equipment operation information uploaded by the data center of the equipment management platform.

In some embodiments, the smart gas service platform may further interact upward with the smart gas user platform, obtain an instruction for obtaining relevant data of the smart gas user platform, and feedback corresponding information. For example, the need information of the gas user sent by the gas user sub-platform may be received through the smart gas usage service sub-platform; and the synergist use information uploaded by the smart gas usage service sub-platform may be uploaded. As another example, the gas equipment operation information query instruction sent by the government user sub-platform may be received through the smart operation service sub-platform; and a current proportioning scheme of natural gas synergists (such as the proportioning features of each synergist) may be uploaded to the government user sub-platform.

The smart gas equipment management platform may process relevant parameters of natural gas of smart gas and gas equipment to determine a target proportioning feature of the synergist that satisfies the user need. In some embodiments, the smart gas equipment management platform may include a smart gas indoor equipment management sub-platform, a smart gas pipeline network equipment management sub-platform, and a smart gas data center. The smart gas indoor equipment management sub-platform and the smart gas pipeline network equipment management sub-platform may be independent of each other. The smart gas indoor equipment management sub-platform and the smart gas pipeline network equipment management sub-platform may bidirectionally interact with the smart gas data center respectively. For example, relevant data transmitted by other platforms to the smart gas equipment management platform may be aggregated to the smart gas data center, and data corresponding to a management sub-platform may be sent to the management sub-platform according to the need of each management sub-platform. Exemplarily, the smart gas data center may send the relevant parameters of indoor equipment (such as gas consumption of the gas user, current combustion temperature, energy consumption of natural gas, etc.) to the smart gas indoor equipment management sub-platform, and a parameter adjustment value of the indoor equipment may be determined through the smart gas indoor equipment management sub-platform.

In some embodiments, each management sub-platform may include an equipment operation parameter monitoring and warning management module and an equipment parameter remote management module. The equipment operation parameter monitoring and warning management module may view historical data and real-time data of equipment operating parameters, and perform monitoring and warning according to preset thresholds.

In some embodiments, the smart gas pipeline network equipment parameter management sub-platform may combine processing of the user need information and monitoring information of gas user equipment/pipeline network equipment to obtain the proportioning scheme of gas synergists in different regions, and perform automatic control.

In some embodiments, the smart gas equipment management platform may interact with other platforms through the smart gas data center. For example, the smart gas equipment management platform may interact downward with the smart gas sensor network platform. The smart gas equipment management platform may send an instruction for obtaining relevant data on operation of gas equipment to the smart gas sensor network platform; and receive relevant data on the operation of the gas equipment uploaded by the smart gas sensor network platform.

The smart gas sensor network platform configured as a communication network and a gateway may be used to receive equipment monitoring data in the smart gas IoT system (such as monitoring data of the indoor equipment and monitoring data of the pipeline network equipment) obtained by the smart gas object platform, and transmit the equipment monitoring data to the smart gas equipment management platform.

In some embodiments, the smart gas sensor network platform may interact downward with the smart gas object platform. For example, the smart gas sensor network platform may receive the relevant data on the gas equipment uploaded by the smart gas object platform; and send an instruction for obtaining the relevant data on the gas equipment to the smart gas object platform. The smart gas sensor network platform may interact upward with the smart gas equipment management platform. For example, the smart gas sensor network platform may receive the instruction for obtaining the relevant data on the gas equipment sent by the data center of the smart gas equipment management platform; and upload the relevant data on the gas equipment to the smart gas data center.

In some embodiments, the smart gas sensor network platform may include a smart gas indoor equipment sensor network sub-platform and a smart gas pipeline network equipment sensor network sub-platform. The smart gas indoor equipment sensor network sub-platform may correspond to the smart gas indoor equipment object sub-platform and may be used to obtain the relevant data of the indoor equipment. The smart gas pipeline network equipment sensor network sub-platform may correspond to the smart gas pipeline network equipment object sub-platform and may be used to obtain the relevant data of the pipeline network equipment.

The smart gas object platform may be configured as various types of gas equipment. The gas equipment may include the indoor equipment (such as a user gas meter, etc.) and the pipeline network equipment (such as gas additive equipment, a gas pipeline, a gas flow meter, valve control equipment, a thermometer, a barometer, etc.). The pipeline network equipment may be used to obtain the monitoring data of the gas pipeline network (such as natural gas flow, air pressure, temperature, etc. in the pipeline network). The pipeline network equipment may also implement the efficiency enhancement scheme of the target proportioning feature by adjusting working parameters of the corresponding equipment (such as controlling total natural gas flow, pressure, and synergist addition proportion of the pipeline network, etc.). The indoor equipment may be used to obtain the monitoring data of each gas user (such as the natural gas consumption of each gas user).

In some embodiments, the smart gas object platform may interact upward with the smart gas sensor network platform. For example, the smart gas object platform may receive the instruction for obtaining the relevant data on the operation of the gas equipment sent by the smart gas sensor network sub-platform; and upload the relevant data on the operation of the gas equipment to the corresponding smart gas sensor network sub-platform.

In some embodiments, the smart gas object platform may include a smart gas indoor equipment object sub-platform and a smart gas pipeline network equipment object sub-platform. The smart gas indoor equipment object sub-platform may correspond to the smart gas indoor equipment sensor network sub-platform, and the relevant data on the operation of the indoor equipment may be uploaded to the smart gas data center through the indoor equipment sensor network sub-platform. The smart gas pipeline network equipment object sub-platform may correspond to the smart gas pipeline network equipment sensor network sub-platform, and the relevant data on the operation of the pipeline network equipment may be uploaded to the smart gas data center through the pipeline network equipment sensor network sub-platform.

It should be understood that the system and modules shown in FIG. 1 may be implemented in various ways.

It should be noted that the above description of the smart gas IoT system and modules is only for convenience of description, and does not limit the description to the scope of the embodiments. It can be understood that for those skilled in the art, after understanding the principle of the system, various modules may be combined arbitrarily, or a subsystem may be formed to connect with other modules without departing from the principle. In some embodiments, the smart gas user platform, the smart gas service platform, the smart gas equipment management platform, the smart gas sensor network platform, and the smart gas object platform disclosed in FIG. 1 may be different modules in a system, or may be one module implementing the functions of the above two or more modules. For example, each module may share one storage module, and each module may also have its own storage module. Such variations are all within the protection scope of the present disclosure.

Figure 2:
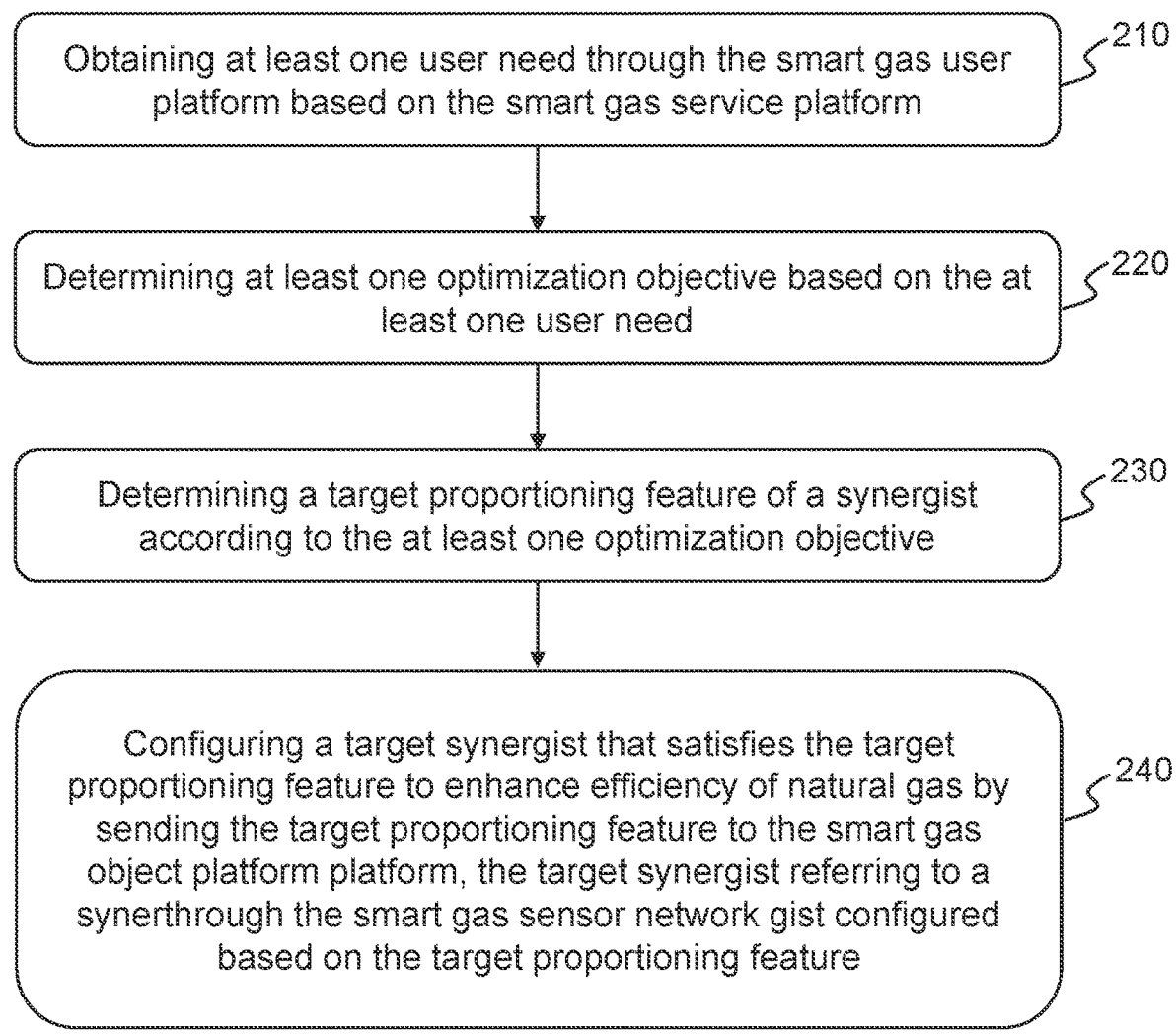
FIG. 2 is a flowchart illustrating an exemplary process of a method for controlling natural gas efficiency enhancement of smart gas according to some embodiments of the present disclosure.

FIG. 2 is a flowchart illustrating an exemplary process of a method for controlling natural gas efficiency enhancement of smart gas according to some embodiments of the present disclosure. In some embodiments, the process 200 may be performed by a smart gas equipment management platform.

As shown in FIG. 2, the process 200 may include the following operations.

In 210, obtaining at least one user need through the smart gas user platform based on the smart gas service platform.

A user need may refer to a requirement of the gas user for the use of natural gas. For example, the user need may include a requirement for combustion temperature of natural gas, a requirement for exhaust gas emission of natural gas, etc. Exemplarily, for an industrial gas user, the user need may be mainly reflected in the requirement for the combustion temperature of natural gas (e.g., 2300° C.). For a commercial gas user, the user need may be mainly reflected in the requirement for the exhaust gas emission of natural gas (e.g., flue gas after complete combustion of 1 cubic meter of natural gas is less than 1.16).

In some embodiments, the user need may include a gas consumption need and a gas usage target need. The gas consumption need may be used to describe the need of the gas user for the consumption of natural gas. For example, for an ordinary gas user (such as a family of three people), the monthly gas consumption need may be 25 to 30 cubic meters of natural gas. The gas usage target need may be used to describe the need of the gas user for performance parameters of natural gas. For example, the gas usage target need for the industrial gas user may include that the combustion temperature of natural gas meets a corresponding industrial need (e.g., 2800° C.).

In some embodiments, the gas consumption need may be determined by the smart gas equipment management platform. For example, the natural gas usage of the gas user may be detected through the smart gas indoor equipment management sub-platform. Then, the natural gas usage may be sent to the smart gas equipment management platform through the smart gas sensor network platform, so as to estimate the gas consumption need of each gas user based on the historical natural gas usage.

In some embodiments, the gas usage target need may be determined by the gas user's interactive operation on the corresponding smart gas user platform. For example, for the industrial gas user with special needs (such as high-temperature calcination of natural gas, welding, etc.), the combustion temperature of natural gas (such as 3200° C.) may be significantly higher than that of general industrial gas users, and the user need may be set through the corresponding user platform (for example, the combustion temperature of natural gas is expected to be higher than 3200° C.).

In some embodiments, the gas usage target need may also include a minimum compliance need for natural gas. For example, the minimum need that should be met for natural gas may be determined according to national normative regulations. Exemplarily, the minimum requirements for the exhaust gas emission of natural gas of various types of gas users may be determined according to normative documents such as *Emission Standard of Air Pollutants for Boiler, Integrated Emission Standard of Air Pollutants*, etc.

In some embodiments, when the gas user sends the gas usage target need to the smart gas equipment management platform through the smart gas service platform and the smart gas user platform, the gas usage target need may be bound to the gas user. For example, the gas user may be bound to the gas usage target need according to an equipment ID or the bound gas user ID uploaded to the smart gas user platform, so as to determine a position of the gas user in the pipeline network and the user target need.

In some embodiments, considering that natural gas efficiency enhancement is generally performed in the pipeline network, the gas users may be grouped according to the natural gas pipeline network. A same group of users may be located in a same natural gas pipeline network. A natural gas efficiency enhancement scheme may be calculated once for the same group of users.

In 220, determining at least one optimization objective based on the at least one user need.

The optimization objective may refer to performance indicators that should be changed for the natural gas to meet the user need. In some embodiments, the optimization objective may be determined by comparing expected performance indicators of natural gas in the user need with current performance indicators of natural gas in actual use. For example, the current combustion temperature of natural gas is 2300° C. When the expected combustion temperature of natural gas in the user needs is 3200° C., the optimization objective may be to increase the combustion temperature by 900° C. The current performance indicators of natural gas may be determined according to operation parameters of the gas equipment. For example, the smart gas object platform may send the operation parameters of each gas equipment to the smart gas equipment management platform through the smart gas sensor network platform to determine the current performance indicators of natural gas.

In some embodiments, the optimization objectives may correspond to the user needs in a one-to-one manner. When the gas usage target need includes a plurality of gas usage sub-objectives, the optimization objective may include a plurality of optimization sub-objectives. Each optimization sub-objective may correspond to the gas usage sub-objective in a one-to-one manner. For example, when the gas user's gas usage target need includes a temperature increase objective (such as an expected combustion temperature of 2500° C.) and an emission reduction objective (such as 10% reduction in emission), the optimization objective may include a temperature optimization sub-objective (a temperature increase of 200° C.) and an emission reduction sub-objective (10% reduction in emission).

In some embodiments, a final optimization objective may be determined according to the user needs. The final optimization objective may be an objective that satisfies the need of each user as much as possible. For example, the final optimization objective may be a maximum value of each natural gas performance requirement in each user need. Exemplarily, different gas users in the same group may include different temperature increase requirements. When a temperature increase of 200° C. may meet 50% of users, a temperature increase of 300° C. may meet 80% of users, and a temperature increase of 500° C. may meet 100% of users, then the temperature increase of 500° C. which satisfies a largest number of users may be selected as the final optimization objective. For more descriptions about the final optimization objective, please refer to the process 300 and related description thereof.

In 230, determining a target proportioning feature of a synergist according to the at least one optimization objective.

The synergist may refer to an additive that improves performance of natural gas. For example, the synergist may include a high-energy substance used to increase a total calorific value of natural gas, a homogeneous catalyst used to reduce activation energy of gas and improve a speed of chemical reaction, a combustion promoter used to promote an interaction between fuel and oxygen, a polymerization inhibitor used to improve diffusion and blending performance of gas and improve a mixing speed and a mixing rate of natural gas and oxygen, and a radiation modifier used to change frequency and wavelength of flame during combustion, activate gas, and suppress thermal radiation of the flame. Exemplarily, the synergist may include an SQ-I rare earth fuel enhancer, and an SQ-II rare earth fuel enhancer.

In some embodiments, the proportioning feature of the synergist may be used to describe a usage manner of each synergist for natural gas efficiency enhancement. In some embodiments, the proportioning feature include a proportioning vector and an addition proportion of the synergist. The proportioning vector may be used to describe an addition amount proportion between each synergist, and the addition proportion may be used to describe a proportion of a total synergist to natural gas.

In some embodiments, the high-energy substance, the homogeneous catalyst, the combustion promoter, the polymerization inhibitor, and the radiation modifier may be used as main components of the synergist. The proportioning vector may be represented as a vector of 5 elements. Each element may correspond to each type of component. An element value may represent the addition proportion of this type of component (such as an addition amount of the component/a total addition amount).

In some embodiments, each type of component may be composed of a plurality of types of sub-components, then each element of the proportioning vector may correspond to each sub-component, and the element value may correspond to an addition proportion of the sub-component. Exemplarily, the proportioning vector of the proportioning feature may be (1, 1, 1, 1, 1), which may represent that the high-energy substance, the homogeneous catalyst, the combustion promoter, the polymerization inhibitor, and the radiation modifier in the synergist are mixed in a proportion of 1:1:1:1:1. The addition proportion of the proportioning feature may be 1%, which may mean that the proportion of the synergist to natural gas is 1:99 for mixing.

The target proportioning feature may refer to a proportioning feature that can satisfy the optimization objective. For example, the target proportioning feature may refer to a proportioning feature that the performance parameters of natural gas after efficiency enhancement can meet the needs of most users (such as 90% or more) after the corresponding synergist is added.

In some embodiments, a final optimization objective that can meet the needs of most users may be determined based on each optimization objective, and the target proportioning feature may be determined based on the final optimization objective. That is, when determining target proportioning feature, the target proportioning feature may only need to satisfy the final optimization objective. For example, the proportioning feature whose performance parameters after efficiency enhancement can satisfy the final optimization objective may be selected from each proportioning feature as the target proportioning feature. For more descriptions about the final optimization objective, please refer to FIG. 3 and related description thereof.

In some embodiments, a plurality of candidate proportioning features may be determined based on a preset proportioning feature generation rule. The proportioning feature that can satisfy the final optimization objective may be selected from each candidate proportioning feature as the target proportioning feature. The preset proportioning feature generation rule may include a random generation rule, a historical selection rule, etc. The random generation rule may refer to generating a plurality of candidate proportioning features by randomly generating each parameter of the proportioning feature. The historical selection rule may refer to determining a plurality of candidate proportioning feature based on historical efficiency enhancement data.

The historical efficiency enhancement data may refer to recorded data of efficiency enhancement of synergists in various historical proportioning features on the historical performance parameters of natural gas (such as the combustion temperature of natural gas, exhaust gas emission, etc.). For example, the historical proportioning feature whose efficiency enhancement of historical performance parameters is consistent with or close to the final optimization objective may be selected from the historical efficiency enhancement data as the candidate proportioning feature. In some embodiments, the historical efficiency enhancement data may also include natural gas equipment parameters (e.g., natural gas flow rate, gas pressure, etc.) when the synergist is added.

In some embodiments, in order to further increase a count of candidate proportioning features, after the candidate proportioning feature is determined based on the historical efficiency enhancement data, the proportioning feature may be adjusted with a preset step size to expand the candidate proportioning feature. For example, the preset step size may be one unit of any parameter. For the proportioning vector (1,1,1,1,1), the proportioning vector may be adjusted to (2,1,1,1,1), (1,2,1,1,1), etc. with a preset step size. The above-mentioned parameter adjustment may be repeated for a plurality of times to determine a plurality of candidate proportioning feature.

In some embodiments, the candidate proportioning feature may also be generated based on iterative processing. The candidate proportioning feature may be expanded, evaluated, and screened in each time of iteration to determine target proportioning feature that satisfies the final optimization objective.

In some embodiments, a constraint that the target proportioning feature satisfies may be determined according to the at least one optimization objective. At least one candidate proportioning feature may be generated according to the constraint. The each candidate proportioning feature may include a candidate proportioning vector and a candidate addition proportion of the synergist. Then, at least one round of iterative processing may be performed on the at least one candidate proportioning feature, and the candidate proportioning feature and an evaluation value after each round of iteration may be determined until the evaluation value satisfies the constraint. Finally, the candidate proportioning feature of the evaluation value satisfying the constraint may be determined as the target proportioning feature. The constraint may be determined according to the at least one optimization objective (such as the final optimization objective), and may be used to represent a requirement that the proportioning scheme after iteration meets. For more descriptions about the iterative processing, please refer to FIG. 4 and related description thereof. The evaluation value may describe implementation of the candidate proportioning feature on the constraint. For more descriptions about determining the evaluation value, please refer to FIG. 5 and related description thereof.

In 240, configuring a target synergist that satisfies the target proportioning feature to enhance efficiency of natural gas by sending the target proportioning feature to the smart gas object platform through the smart gas sensor network platform. The target synergist may refer to a synergist configured based on the target proportioning feature.

In some embodiments, considering that the synergist is generally added in the pipeline network equipment, efficiency enhancement may be performed for natural gas by controlling the pipeline network equipment (e.g., gas additive equipment) to add the target synergist according to the target proportioning feature. The pipeline network equipment may obtain the corresponding equipment parameters from the smart gas equipment management platform through the smart gas sensor network platform.

In some embodiments, after considering the use of the target synergist, in order to make full use of the synergist, other relevant parameters of natural gas (such as internal pressure, flow rate, etc.) should also be adjusted adaptively. Then, the operation parameters of other gas equipment may be determined according to the target synergist, and sent to the corresponding gas equipment through the smart gas sensor network platform. For example, if more natural gas needs to be released per unit time to increase the combustion temperature of natural gas, the natural gas flow rate in the pipeline network equipment and the indoor equipment may be adjusted to meet the need of the target synergist.

In some embodiments, considering that the synergist of the present disclosure is determined based on a plurality of gas users of a same pipeline network, when the target synergist is determined, the synergist of each pipeline network may be combined to determine the synergist of each gas supply station, so as to improve safety of adding the synergist. For example, if both a pipeline network A and a pipeline network B are supplied with gas at a gas supply point 1, it may be considered to add a same part of the synergist of the pipeline networks A and B at gas supply point 1, and the part of the synergist is not added at the pipeline networks A and B.

The method for controlling natural gas efficiency enhancement provided by some embodiments of the present disclosure may analyze the user need of each gas user, and analyze the optimization objective of natural gas, and then determine the target synergist for efficiency enhancement, so that the target synergist may be determined based on the optimization objective. Therefore, the determined target synergist can meet the user needs of most gas users and improve use rationality of the synergist.

FIG. 3 is a flowchart illustrating an exemplary process for determining a target proportioning feature of a synergist according to some embodiments of the present disclosure. In some embodiments, the process 300 may be performed by a smart gas equipment management platform.

As shown in FIG. 3, the process 300 may include the following operations.

In 310, for each optimization objective of the at least one optimization objective, determining a user satisfaction degree of each user need of the at least one user need to the optimization objective.

The user satisfaction degree may refer to a degree of user satisfaction on the optimization objective. In some embodiments, the user satisfaction degree of the user need to the optimization objective may be represented by a degree of implementation of the optimization objective on the user needs. For example, if a user need is to increase a temperature by 800° C., and a certain optimization objective is to increase a temperature by 500° C., the user satisfaction degree on the optimization objective may be 500° C./800° C.=62.5%.

In some embodiments, for each optimization objective, the satisfaction degree of the optimization objective with the each user need may be calculated. For example, when the gas user includes users A, B, C, D, E, and F, if the user satisfaction degree of the user need of gas user A to an optimization objective a may be recorded as Aa, the user satisfaction degree of the optimization objective a may include Aa, Ba, Ca, Da, Ea and Fa.

In some embodiments, when the gas usage target need includes at least two gas usage sub-objectives, for each optimization objective of the at least one optimization objective, the smart gas equipment management platform may determine a sub-user satisfaction degree of each gas usage sub-objective of the user needs to the optimization objective. The user satisfaction degree of the user need to the optimization objective may be determined according to each sub-user satisfaction degree of the user need. For example, if the user need of the user B may include a temperature increase objective B1 and an emission reduction objective B2, the satisfaction degree Ba of the user need of the gas user B to the optimization objective a may be determined according to a temperature increase satisfaction degree Ba1 and an emission reduction satisfaction degree Ba2. Exemplarily, Ba=(Ba1+Ba2)/2. That is, the satisfaction degree Ba may be a mean value of the temperature increase satisfaction degree Ba1 and the emission reduction satisfaction degree Ba2.

In some embodiments, a degree of need of the each gas usage sub-objective may be determined according to the at least two gas usage sub-objectives. A weight of the gas usage sub-objective may be determined based on the degree of need of the gas usage sub-objective. The degree of need of the gas usage sub-objective may refer to intensity of willingness of the gas user to realize the sub-objective. For example, when the user B needs to increase the temperature more than the emission reduction, a high weight (such as 0.7) may be assigned to the temperature increase satisfaction degree Ba1 and a low weight (such as 0.3) may be assigned to the emission reduction satisfaction degree Ba2 according to an actual situation, at this time, Ba=0.7*Ba1+0.3*Ba2.

In some embodiments, the degree of need may be determined according to a specific use and/or a willingness of the gas user. For example, when the gas user inputs the user need, the gas user may choose a sub-objective with more attention, and the selected sub-objective may have a higher degree of need. As another example, the degree of need may be determined according to a nature of the gas user. For example, the industrial gas user may attach more importance to the temperature increase objective, accordingly, the industrial gas user may have a higher degree of need for the temperature increase sub-objective. The commercial gas user may attach more importance to the emission reduction objective, accordingly, the commercial gas user may have a higher degree of need for the emission reduction sub-objective.

Based on the above calculation manner, the influence of various sub-objectives may be fully considered when determining user satisfaction degree, which may improve the ability to represent the user satisfaction degree, and further improve the ability of the final optimization objective to meet the user need.

In 320, determining a total satisfaction degree of the optimization objective according to each user satisfaction degree corresponding to the optimization objective.

The total satisfaction degree may refer to a total satisfaction degree of each user to a certain optimization objective. In some embodiments, the total satisfaction degree may be represented as a sum of each user satisfaction degree of the optimization objective. For example, the total satisfaction degree of the optimization objective a may be Aa+Ba+Ca+Da+Ea+Fa.

In some embodiments, considering that each gas user is a user in a same natural gas pipeline, after efficiency enhancement, each user may enjoy same efficiency-enhanced natural gas. Then, when the total satisfaction degree is calculated, a weight of the user satisfaction degree may be adjusted based on an actual gas usage of each gas user, so as to improve a representation ability of the total satisfaction degree. That is, a weight of the user need may be determined first. Then, for each optimization objective of the at least one optimization objective, weighting processing may be performed on each user satisfaction degree corresponding to the optimization objective according to the weight to determine the total satisfaction degree of the optimization objective.

The weight of the user need may reflect the gas usage of the user. In some embodiments, the weight may be positively correlated with a gas consumption need of the gas user. For example, the weight of the user A=the gas consumption need of the user Na sum of the gas consumption need of users in this group. Exemplarily, the weight of the user A may be denoted as wA, and other users may be deduced by analogy. Then the total satisfaction degree of the optimization objective a may be wA*Aa+wB*Ba+wC*Ca+ wD*Da+wE*Ea+wF*Fa.

In 330, determining a final optimization objective according to the total satisfaction degree of each optimization objective.

The final optimization objective may satisfy the optimization objective of each user need as much as possible. For example, the optimization objective with a maximum total satisfaction degree may be selected from the optimization objectives as the final optimization objective according to the total satisfaction degree of each optimization objective.

In some embodiments, other restrictions may also be considered when the final optimization objective is determined. The final optimization objective may be selected from various optimization objectives that satisfy the restriction. The restriction may include a cost restriction and a technical restriction. The technical restriction may be a maximum optimization indicator that can be achieved under a current state (e.g., the maximum increase temperature of natural gas is 800° C., the temperature increase sub-objective beyond 800° C. cannot be achieved). The cost restriction may mean that an estimated total cost of the optimization objective may be smaller than the cost restriction.

In some embodiments, the cost restriction and/or technical restriction may be obtained first. Then, it may be determined whether each optimization objective satisfies the cost restriction and the technical restriction, and the optimization objective with a maximum user satisfaction degree may be selected as the final optimization objective from the optimization objectives that satisfy the cost restriction and technical restriction. When it is determined whether the optimization objective satisfies the cost restriction, a minimum cost may be determined based on the synergist that can achieve the optimization objective in the historical efficiency enhancement data. When the minimum cost is smaller than a cost threshold in the cost restriction, the optimization objective may satisfy the cost restriction, otherwise the optimization objective may not satisfy the cost restriction.

In 340, determining the target proportioning feature according to the final optimization objective.

In some embodiments, the final optimization objective may be used as a constraint of the target proportioning feature. That is, the target proportioning feature may refer to a proportioning feature that can satisfy the final optimization objective. For example, the performance parameters of natural gas after the synergist corresponding to each candidate proportioning feature is implemented may be estimated. When the performance parameters of natural gas satisfy the final optimization objective, the candidate proportioning feature corresponding to the performance parameters of natural gas may be used as the target proportioning feature.

Based on the manner for determining the final optimization objective according to some embodiments of the present disclosure, the final optimization objective that can satisfy the most users may be determined through the user satisfaction degree, so that the target proportioning feature determined based on the final optimization objective may meet the needs of the most users, thereby further improving the use rationality of the target synergist.

Figure 4:
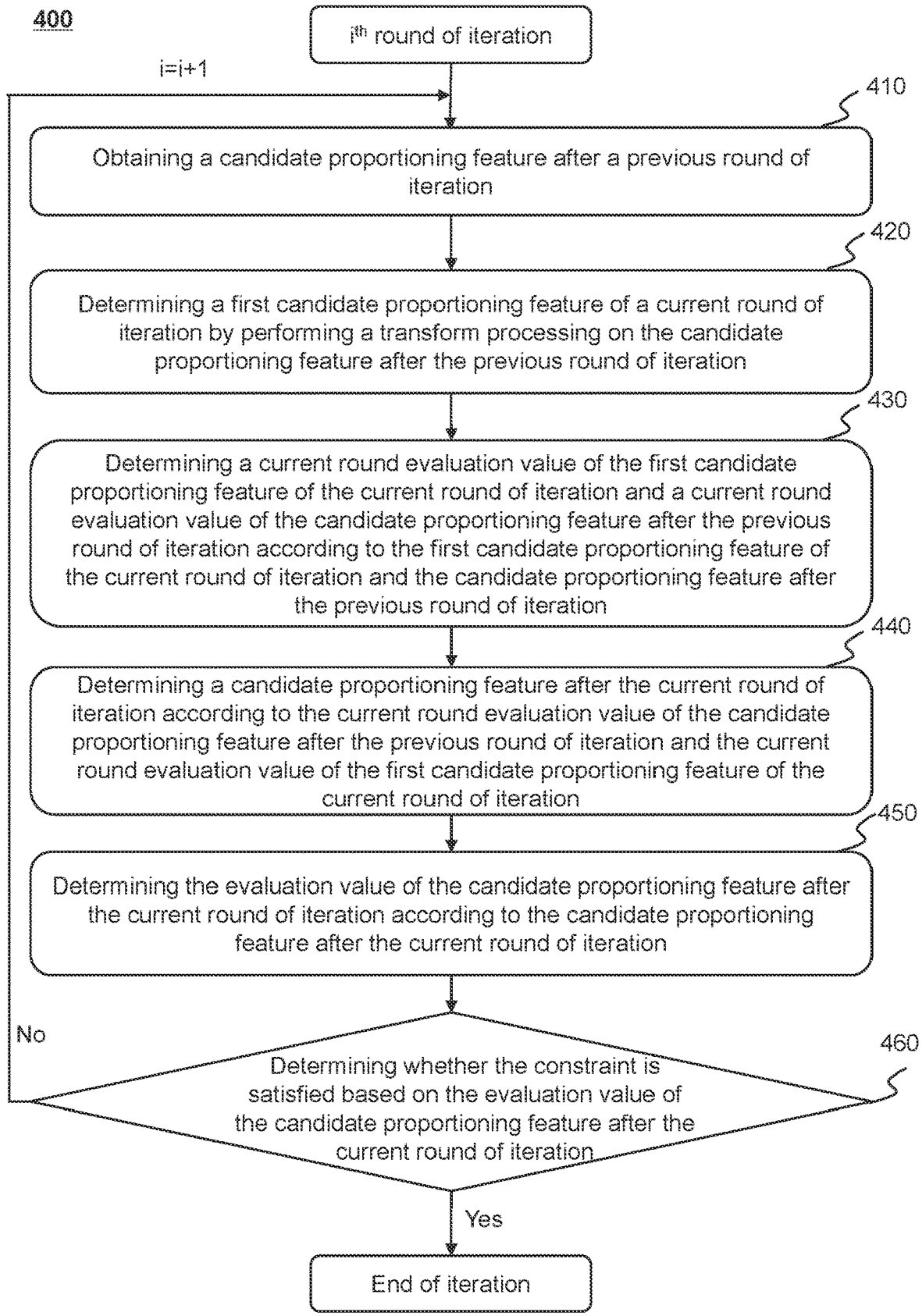
FIG. 4 is a schematic diagram illustrating iterative processing of a candidate proportioning feature according to some embodiments of the present disclosure.

FIG. 4 is a schematic diagram illustrating iterative processing of a candidate proportioning feature according to some embodiments of the present disclosure.

As shown in FIG. 4, the process 400 of the $i^{th}$ round of iteration may include the following operations.

In 410, obtaining a candidate proportioning feature after a previous round of iteration.

In some embodiments, in each round of iterative processing, at least one candidate proportioning feature may be determined after a current round of iteration is completed. In 410, when i>1, the candidate proportioning feature of a previous round of iteration may be directly obtained. When i=1, at least one candidate proportioning feature may be initialized first as the candidate proportioning feature of current round.

In some embodiments, when the candidate proportioning feature is initialized, a plurality of candidate proportioning features may be determined from historical efficiency enhancement data. Expanding may be performed based on at least one synergist combination (e.g., increasing or decreasing the content of each component) to determine a plurality of synergist combinations and use the synergist combinations as the candidate proportioning features of the current round. For more descriptions about the historical efficiency enhancement data, please refer to the operation 230 and related description thereof.

In some embodiments, considering that the candidate proportioning feature includes a candidate proportioning vector and a candidate addition proportion of the synergist, the candidate proportioning feature may be represented by a feature vector. A count of elements of the feature vector may be a count of components in an additive plus 1. One element in the feature vector may represent the candidate addition proportion of the synergist relative to natural gas, and other elements may represent the candidate proportioning vector of each component. For example, when the synergist may consist of 1 high-energy substance, 1 homogeneous catalyst, 2 combustion promoters, 1 polymerization inhibitor, 2 radiation modifiers, and 2 commercial synergist combinations, the synergist may include 9 components, and the feature vector may include 10 elements. The elements 1-9 may correspond to each component respectively. An element value may represent a proportion of a component corresponding to the element value in the synergist. The element 10 may represent the candidate addition proportion.

In 420, determining a first candidate proportioning feature of the current round of iteration by performing a transform processing on the candidate proportioning feature after the previous round of iteration.

The transform processing may refer to transformation of the element value of each element in the feature vector. For example, the transform processing may include a cross transformation, a mutation transformation, a duplication transformation, or any combination thereof.

The cross transformation may refer to exchanging element values of an element of the two candidate proportioning feature for selected two candidate proportioning features. The mutation transformation may transform an element value of an element only for the selected candidate proportioning feature. The duplication transformation may refer to duplicate the selected candidate proportioning feature. For example, for a candidate proportioning feature A (1,1,1,0,2,0,1,0,0,5), and a candidate proportioning feature B (1,1,0,2,2,0,1, 0,0,4), when the cross transformation is performed on a third element of the candidate proportioning features A and B, transformed proportioning features may be C (1,1,0,0,2,0,1,0, 0,5), and D (1,1,1,2,2,0,1,0,0,4). When the mutation processing is performed on a seventh element of the candidate proportioning feature A, a transformed proportioning feature may be E (1,1,1,0,2,0,3,0,0,5). When the mutation processing is performed on the sixth element of the candidate proportioning feature B, a transformed proportioning feature may be F (1,1,0,2,2,1,1,0,0,4).

In some embodiments, the cross transformation and the mutation transformation may be two main transformation manners. The duplication transformation may be generally performed together with the other two transformations to expand a count of candidate proportioning features. For example, for the candidate proportioning features A and B, during transformation, A' and B' may be duplicated first, and then the cross transformation and/or the mutation transformation may be performed on the candidate proportioning features A' and B' to determine candidate proportioning features G, and H. Following the previous example, the proportioning feature A' may be consistent with the proportioning feature A, and the proportioning feature B' may be consistent with the proportioning feature B. The cross transformation and/or the mutation transformation is described above.

In some embodiments, considering the cost constraint of the candidate proportioning feature, when each candidate proportioning feature is transformed, the candidate proportioning feature may be transformed from a perspective of reducing the execution cost of the candidate proportioning feature, thereby obtaining the candidate proportioning feature with lower cost. That is, the cost change of each transformation direction of at least two transformation directions may be determined first. Then, a transformation probability of the transformation direction may be determined according to the cost change of the transformation direction. Finally, a specific transformation direction of the candidate proportioning feature may be determined according to the transformation probability of each transformation direction of the at least two transformation directions.

The transformation direction may refer to a direction in which each element value after transformation changes relative to a direction before transformation. For example, when an element a is transformed and the candidate addition proportion (i.e., the proportion of the synergist to natural gas) is unchanged, if a proportion of the element a after the transformation in the synergist is greater than a proportion of the element a before the transformation in the synergist, then the transformation direction may be becoming larger. Otherwise, the transform direction may be becoming smaller. Exemplarily, for the proportioning feature (1, 1, 0, 0, 2, 0, 1, 0, 0, 5), a component a represented by a first element may account for 20% of a current synergist. If the proportioning feature after the transformation is (4,1,0,0,2,0,1,0,0,5), then the proportion of the component a in the synergist is 50%, which may indicate that the transformation direction of the component a is becoming larger.

The cost change may refer to the change of the execution cost of the candidate proportioning feature after the element value of a certain component transforms relative to the execution cost before the transformation. For example, when the candidate addition proportion is constant and the proportion of the component a is increased, a price of the synergist after the transformation may be greater than a price of the synergist before the transformation, which may indicate that increasing the component a leads to an increase in the cost of the synergist, and vice versa.

In some embodiments, for the purpose of reducing the overall cost of the synergist, the transformation direction of each component may be actively controlled during the transformation to reduce the cost of the synergist. For example, different probabilities may be assigned to each of two transformation directions of a component. The transformation direction that leads to an increase in cost may have a smaller transformation probability. For example, a probability (e.g., 0.7) that the element value of the component a becomes smaller should be greater than a probability (e.g., 0.3) that the element value of the component a becomes larger.

In some embodiments, the cost change of the synergist may be determined according to a market price of each component. For example, an average price of the current synergist may be calculated. When a unit price of the component is higher than the average price, a probability of the element value corresponding to the component becoming smaller should be greater than a probability of the element value corresponding to the component becoming larger, otherwise, the probability of the element value corresponding to the component becoming smaller should be smaller than the probability of the element value corresponding to the component becoming larger.

In some embodiments, after the transformation probability of each element in the candidate proportioning feature, elements may be randomly selected according to the transformation probability for the cross transformation and/or the mutation transformation. For example, when the element value of component a is transformed (such as the mutation transformation), there may be a 70% of probability that the proportion of the component a may become smaller, and there may be a 30% of probability that the proportion of the component a may become larger.

In 430, determining a current round evaluation value of the first candidate proportioning feature of the round of iteration and a current round evaluation value of the candidate proportioning feature after the previous round of iteration according to the first candidate proportioning feature of current round of iteration and the candidate proportioning feature after the previous round of iteration.

In some embodiments, the evaluation value may be used to reflect satisfaction of the candidate proportioning feature to the constraint. For example, when the evaluation value of the candidate proportioning feature is relatively large, after the corresponding candidate proportioning feature is executed, the performance parameters of natural gas may be closer to the constraint (such as the final optimization objective). Otherwise, the performance parameters of natural gas may not satisfy the constraint.

In some embodiments, the evaluation value may be determined based on the performance parameters of natural gas after the candidate proportioning feature is executed. For example, the evaluation value of the candidate proportioning feature may be determined by querying whether the efficiency enhancement of the performance parameters of natural gas in historical efficiency enhancement data of a historical proportioning feature or an approximate feature satisfies the final optimization objective. If the historical performance parameters satisfy the final optimization objective, the evaluation value may be 1. If the historical performance parameters cannot satisfy the final optimization objective, the evaluation value may be determined according to difference between the historical performance parameters and the final optimization objective.

In some embodiments, considering that there is candidate proportioning feature recorded in the historical efficiency enhancement data, when the evaluation value is determined, the candidate proportioning feature may also be processed by a pre-trained machine learning model to determine the performance parameters of natural gas after the candidate proportioning feature is executed (after efficiency enhancement), and then the evaluation value may be determined according to the performance parameters after efficiency enhancement. For more descriptions about determining the evaluation value based on the machine learning model, please refer to FIG. 5 and related descriptions thereof.

The current round evaluation value may refer to an evaluation value determined by directly evaluating the first candidate proportioning feature of the current round of iteration and the candidate proportioning feature after the previous round of iteration after the first candidate proportioning feature of the current round of iteration and the candidate proportioning feature after the previous round of iteration are determined.

In some embodiments, considering that there may be a large count of a certain type of candidate proportioning feature with relatively high evaluation values during the iterative process, after several iterations, the candidate proportioning features different from the type of the candidate proportioning feature may have relatively low evaluation value and may be all screened out, which may make it difficult to continue the iteration. Therefore, a clustering evaluation value may be introduced, so that the evaluation value may be determined based on an objective completion evaluation value and the clustering evaluation value, and only candidate proportioning features with relatively high evaluation values in each type of candidate proportioning features may be retained, thereby increasing richness of the candidate proportioning features. The evaluation value may be positively correlated with the objective completion evaluation value, and negatively correlated with the clustering evaluation value.

The objective completion evaluation value may represent completion of the candidate proportioning feature to the final optimization objective. For example, if the candidate proportioning feature represent an increase of 300° C., and the final optimization objective represents a temperature increase of 600° C., then the objective completion evaluation value may be 50%. The clustering evaluation value may represent the proportion of other features that are similar to the candidate proportioning feature. For example, the clustering evaluation value=a count of candidate proportioning features similar to the candidate proportioning feature/a total count of candidate proportioning features. The candidate proportioning features similar to the candidate proportioning feature may be other candidate proportioning features whose parameters are close to the candidate proportioning feature.

In some embodiments, the candidate proportioning feature similar to the candidate proportioning feature may be determined according to each element value of the feature vector. For example, the similar candidate proportioning feature may refer to a candidate proportioning feature where only one component is different and a difference between values of the distinguishing items is smaller than a preset difference value.

In some embodiments, when the evaluation value is determined, the objective completion evaluation value of the candidate proportioning feature after the current round of iteration may be determined through a preset evaluation function according to the constraint. Then, the clustering evaluation value of the candidate proportioning feature after the current round of iteration may be determined according to each candidate proportioning feature of the candidate proportioning features after the current round of iteration. Finally, the evaluation value of the candidate proportioning feature after the current round of iteration may be determined according to the objective completion evaluation value and the clustering evaluation value. The preset evaluation function may be used to process the candidate proportioning feature to determine the objective completion evaluation value. For example, the preset evaluation function may be a trained machine learning model. An input of the preset evaluation function may be the candidate proportioning feature and the current performance parameters of natural gas, and an output of the preset evaluation function may be the performance parameters of natural gas after the candidate proportioning feature is executed (after efficiency enhancement). The performance parameters of the natural gas after efficiency enhancement may be compared with the final optimization objective, so as to determine the objective completion evaluation value of the candidate proportioning feature.

In some embodiments, the clustering evaluation value may be determined based on a distance between the candidate proportioning feature and other candidate proportioning feature. For example, the distance between each candidate proportioning feature (such as a Euclidean distance, a Hamming distance, etc.) may be calculated according to the feature vector. Then, the candidate proportioning feature whose distance are within a preset range may be regarded as the candidate proportioning feature similar to the candidate proportioning feature, and the clustering evaluation value may be calculated according to a count of the candidate proportioning features similar to the candidate proportioning feature.

In some embodiments, the candidate proportioning features similar to the candidate proportioning feature may also be recorded as candidate proportioning features of a same type. Then, a plurality of types of candidate proportioning features may be determined based on a clustering algorithm. For any type of candidate proportioning features, the clustering evaluation value may be a count of candidate proportioning features of the type/a total count of candidate proportioning features. The clustering algorithm may include, but is not limited to, a k-means clustering algorithm, a density-based spatial clustering of applications with noise (DBSCAN) clustering algorithm, etc.

In some embodiments, the evaluation value may be calculated directly based on the objective completion evaluation value and the clustering evaluation value. For example, evaluation value=$\alpha$*objective completion evaluation value-$\beta$*clustering evaluation value, where $\alpha$ and $\beta$ may be set according to experience. Exemplarily, both $\alpha$ and $\beta$ may be 1.

In some embodiments, considering that the objective completion evaluation value of the candidate proportioning feature after the previous iteration is calculated in the previous round of iteration, the objective completion evaluation value may be directly called in the current round of iteration, and the evaluation value of the current round may be determined according to the recalculated clustering evaluation value.

In 440, determining a candidate proportioning feature after the current round of iteration according to the current round evaluation value of the candidate proportioning feature after the previous round of iteration and the current round evaluation value of the first candidate proportioning feature of the current round of iteration.

In some embodiments, each candidate proportioning feature of the candidate proportioning feature after the previous round of iteration and the first candidate proportioning feature of the current round of iteration may be screened based on the current round evaluation value. For example, 10 candidate proportioning features with a largest current round evaluation value in the candidate proportioning feature after the previous round of iteration and the first candidate proportioning feature of the current round of iteration may be screened according to the current round evaluation value as the candidate proportioning features after the current round of iteration. As another example, the candidate proportioning feature whose current round evaluation value are greater than a preset threshold may be screened out as the candidate proportioning feature after the current round of iteration.

In 450, determining the evaluation value of the candidate proportioning feature after the current round of iteration according to the candidate proportioning feature after current round of iteration.

In some embodiments, after the candidate proportioning feature after current round of iteration is determined, the evaluation value may be recalculated based on the candidate proportioning feature after the current round of iteration. For example, for a candidate proportioning feature A that has a plurality of candidate proportioning features of a same type, after the candidate proportioning features of the same type are screened out, the evaluation value of the candidate proportioning feature A may increase. The recalculation process of the evaluation value may be mainly embodied in the recalculation of the clustering evaluation value of each candidate proportioning feature. The objective completion evaluation value of the candidate proportioning feature may follow the calculation result of the operation 430.

In 460, determining whether the constraint is satisfied based on the evaluation value of the candidate proportioning feature after the current round of iteration.

The constraint may be a condition that the objective proportioning feature should satisfy. For example, the constraint may include that the performance parameters of natural gas after efficiency enhancement should meet the final optimization objective after the proportioning feature is executed. For example, the constraint may be performance indicators that are not recorded in the historical efficiency improvement data or compliance with the performance indicators (such as temperature increase of 500° C. and emission reduction of 10%). During iteration, the proportioning feature that satisfies the final optimization objective may be continuously screened out from known data by continuously iterating the candidate proportioning features. As another example, the constraint may also include a cost constraint on the synergist. The synergist determined directly based on the performance indicators may have a relatively high cost. Therefore, by iterating each component, the efficiency enhancement effect of the synergist may be guaranteed, and the cost of the synergist may be reduced.

In the process of determining whether the candidate proportioning feature satisfies the constraint, when the candidate proportioning feature satisfies the constraint, the candidate proportioning feature satisfying the constraint may be used as the target proportioning feature, and the iteration may end. When the candidate proportioning feature does not satisfy the constraint, a next round of iteration may continue.

In some embodiments, considering that the determining whether the constraint is satisfied is mainly based on whether the final optimization objective is satisfied, the operation 450 may also be omitted, and the objective completion evaluation value in the evaluation value may be directly used to determine whether the constraint is satisfied.

Based on the proportioning feature iteration manner according to some embodiments of the present disclosure, the candidate proportioning feature may be expanded and the candidate proportioning feature may be reasonably evaluated, thereby improving rationality of the target proportioning feature. The clustering evaluation value may be also introduced, which may reduce the evaluation values of candidate proportioning features of the same type and further improve the richness of the candidate proportioning features. In addition, based on the consideration of cost reduction, the cost constraint and the transformation direction probability may be introduced, so that the cost of candidate proportioning feature in the iteration may be gradually reduced until the cost constraint is met.

Figure 5:
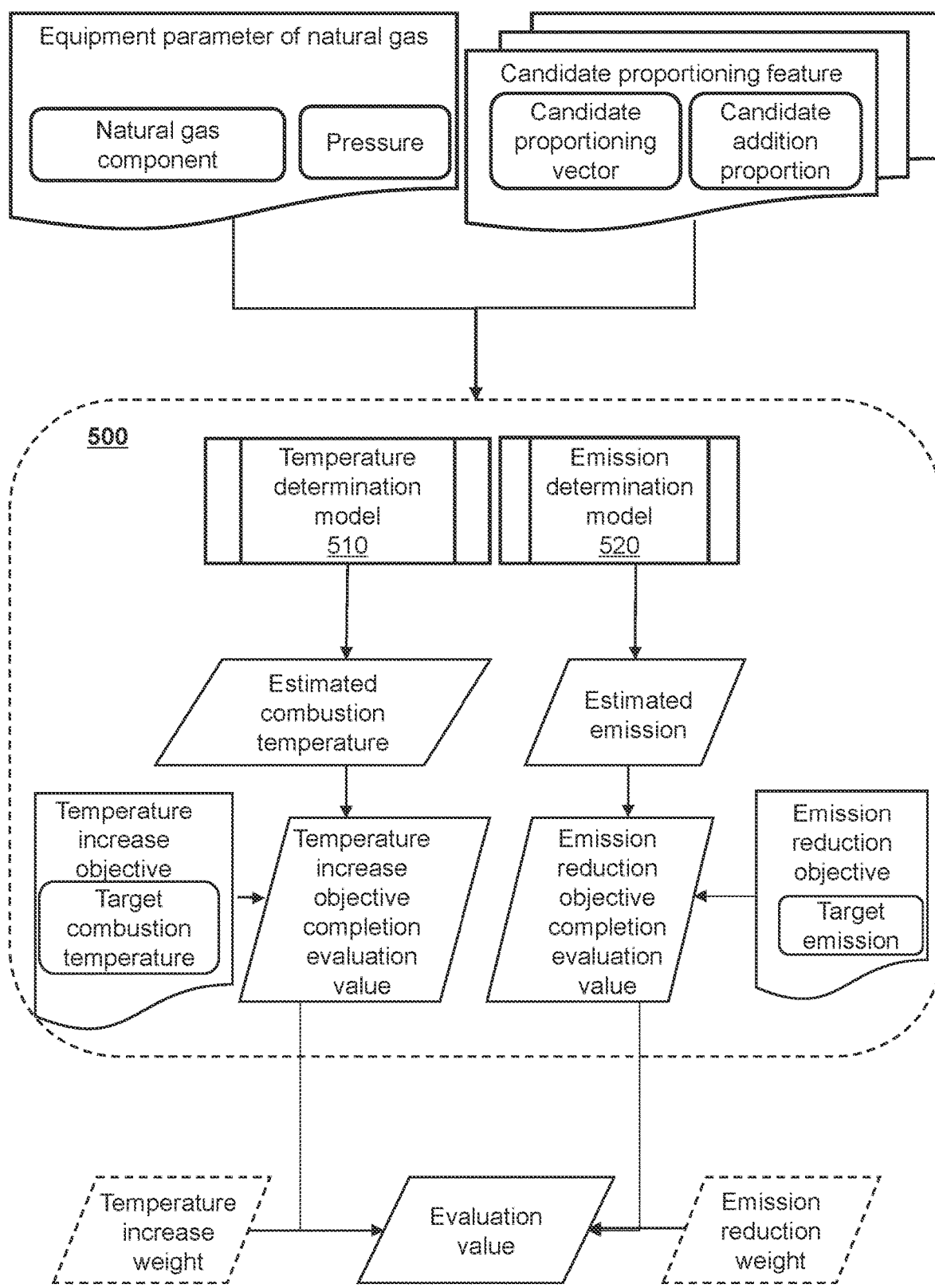
FIG. 5 is a schematic diagram illustrating a process of determining an objective completion evaluation value according to some embodiments of the present disclosure.

FIG. 5 is a schematic diagram illustrating a process of determining an objective completion evaluation value according to some embodiments of the present disclosure.

As shown in FIG. 5, considering that the constraint may include a plurality of sub-constraints, when the evaluation value is determined, a sub-objective completion evaluation value of each sub-constraint of the at least one sub-constraint may be determined through a preset evaluation function 500. Then, the corresponding sub-objective completion evaluation value may be weighted according to the sub-constraint, and a weighted sum of the sub-objective completion evaluation values may be used as the objective completion evaluation value.

As shown in FIG. 5, the constraint may generally include a temperature increase objective and an emission reduction objective. The preset evaluation function 500 may include a temperature determination model 510, an emission determination model 520, and a comparison algorithm (not shown in the figure). The comparison algorithm may compare outputs of the temperature determination model 510 and the emission determination model 520 with relevant parameters to determine the corresponding sub-objective completion evaluation value.

The temperature determination model 510 may be used to estimate a temperature change value of a candidate proportioning feature after a current round of iteration is executed, and then determine a temperature increase objective completion evaluation value according to the temperature change value and the temperature increase objective. For the candidate proportioning feature, please refer to FIG. 4 and related description thereof. For the temperature increase objective, please refer to FIG. 2 and related description thereof. The temperature change value may refer to a change in the combustion temperature of natural gas after a synergist corresponding to the candidate proportioning feature is added. The temperature increase objective completion evaluation value may be used to describe completion of the temperature change value in the temperature increase objective. For example, temperature increase objective completion evaluation value=temperature change value/temperature increase objective.

In some embodiments, the temperature determination model 510 may be a trained machine learning model. For example, the temperature determination model 510 may be a Deep Neural Networks (DNN) model. An input of the temperature determination model 510 may be equipment parameters of natural gas (such as a natural gas component, pressure, etc.) and the candidate proportioning feature, and an output of the temperature determination model 510 may be an estimated combustion temperature of natural gas. The estimated combustion temperature of natural gas may refer to a combustion temperature of natural gas after the synergist configured based on the candidate proportioning feature is added. After the estimated combustion temperature of the natural gas is determined, the evaluation function 500 (e.g., a comparison algorithm) may determine the temperature increase objective completion evaluation value based on the estimated combustion temperature of the natural gas and the temperature increase objective (e.g., a target combustion temperature after efficiency enhancement). For example, temperature increase objective completion evaluation value=1/(target combustion temperature-estimated combustion temperature).

In some embodiments, the temperature determination model 510 may be trained based on historical efficiency enhancement data. A first training sample may be the equipment parameters of natural gas in the historical efficiency enhancement data and a historical proportioning feature of a historical synergist. A first training label may be a historical combustion temperature corresponding to the historical synergist and the equipment parameters of natural gas. During training, the first training sample may be inputted into the temperature determination model 510 without set parameters. The estimated combustion temperature may be outputted. A loss function may be constructed based on the historical combustion temperature and the estimated combustion temperature to iterate the parameters of the temperature determination model 510 until the training is completed.

The emission determination model 520 may be used to estimate an emission change value after the candidate proportioning feature of the current round of iteration is executed, and then determine an emission reduction objective completion evaluation value according to the emission change value and the emission reduction objective. For the candidate proportioning feature, please refer to FIG. 4 and related description thereof. For the emission reduction objective, please refer to FIG. 2 and related description thereof. The emission change value may refer to a change in natural gas emission after a synergist corresponding to the candidate proportioning feature is added. The emission reduction objective completion evaluation value may be used to describe the completion of the emission change value in the emission reduction objective. For example, emission reduction objective completion evaluation value=emission change value/emission reduction objective.

In some embodiments, the emission determination model 520 may be a trained machine learning model. For example, the emission determination model 520 may be a DNN model. An input of the emission determination model 520 may be the equipment parameters of natural gas (such as a natural gas component, pressure, etc.) and the candidate proportioning feature, and an output of the emission determination model 520 may be estimated emission of natural gas. The estimated emission of natural gas may refer to emission of natural gas after efficiency enhancement after the synergist configured based on the candidate proportioning feature is added. After the estimated emission of natural gas is determined, the evaluation function 500 (e.g., a comparison algorithm) may determine the emission reduction objective completion evaluation value based on the estimated emission of natural gas and the emission reduction objective (e.g., a target emission after efficiency enhancement). For example, emission reduction objective completion evaluation value=target emission-estimated emission.

In some embodiments, the emission determination model 520 may be trained based on the historical efficiency enhancement data. A second training sample may be the equipment parameters of natural gas in the historical efficiency enhancement data and the historical proportioning feature of the historical synergist. A second training label may be historical emission corresponding to the equipment parameters of natural gas and the historical synergist. During training, the second training sample may be inputted into the emission determination model 520 without set parameters. The estimated emission may be outputted. A loss function may be constructed based on the historical emission and the estimated emission to iterate the parameters of the emission determination model 520 until the training is completed.

In some embodiments, considering the cost constraint, a cost evaluation value may also be introduced to the evaluation value to improve the evaluation value of a method a with relatively low cost. Cost evaluation value=execution cost/maximum total cost. The objective completion evaluation value may be negatively correlated with the cost evaluation value. The execution cost may refer to the cost of one standard unit of the combustion promotor corresponding to the candidate proportioning feature (such as the cost of the combustion prom otor required by 1 $m^3$ of natural gas). The maximum total cost may refer to the maximum cost of the unit of combustion promotor set by the relevant staff.

In some embodiments, the execution cost of the candidate proportioning feature after current round of iteration may be determined first. Then, the cost evaluation value may be determined according to the execution cost and the cost constraint. Finally, the evaluation value may be determined according to the cost evaluation value, the temperature increase objective completion evaluation value, and the emission reduction objective completion evaluation value. For example, the estimated cost per unit of the synergist may be determined as the execution cost according to a price of each component in the candidate proportioning feature. Then the cost evaluation value (e.g., cost evaluation value=estimated cost per unit of synergist/maximum cost per unit of synergist) may be determined according to the execution cost and the cost constraint (e.g., the maximum cost per unit of synergist). Finally, the evaluation value may be determined by weighted calculation based on the cost evaluation value, the temperature increase objective completion evaluation value, and the emission reduction objective completion evaluation value. Evaluation value=cost evaluation value+temperature increase objective completion evaluation value+emission reduction objective completion evaluation value.

In some embodiments, when the evaluation value is calculated, the execution cost may be calculated first, and then each candidate proportioning feature whose execution cost is higher than a cost threshold may be screened out.

In some embodiments, importance of the temperature increase objective and the emission reduction objective may also be considered when the evaluation value is determined, and weighting processing may be performed on the temperature increase objective completion evaluation value and the emission reduction objective completion evaluation value. For example, a temperature increase weight of the temperature increase objective completion evaluation value and an emission reduction weight of the emission reduction objective completion evaluation value may be determined first according to at least one user need. Then, the weighting processing may be performed on the temperature increase objective completion evaluation value and the emission reduction objective completion evaluation value according to the temperature increase weight and the emission reduction weight, so as to determine the objective completion evaluation value. That is, objective completion evaluation value=temperature increase weight $\alpha$*temperature increase objective completion evaluation value+emission reduction weight $\beta$*emission reduction objective completion evaluation value.

In some embodiments, considering that the temperature increase objective completion evaluation value and emission reduction objective completion evaluation value may be calculated based on different algorithms, and units and measurement manners are different, it may be difficult to directly superimpose the temperature increase objective completion evaluation value and emission reduction objective completion evaluation value. The temperature increase objective completion evaluation value and the emission reduction objective completion evaluation value may be normalized before superimposing. For example, the temperature increase objective completion evaluation value and the emission reduction objective completion evaluation value may be converted into numerical values in an interval of [0,1]. The closer the numerical value is to 1, the closer the candidate proportioning feature may be to the final optimization objective, and the closer the value is to 0, the less likely to the final optimization objective may be achieved.

In some embodiments, the temperature increase weight and the emission reduction weight may be determined according to actual needs of gas consumption. For example, when the degree of need of each gas usage sub-objective is determined, the degree of need of the temperature increase sub-objective and the degree of need of the emission reduction sub-objective of each gas user may be counted, and a sum of the degree of need of the temperature increase sub-objectives, a sum of the degree of need degree of the emission reduction sub-objectives, and a sum of the degree of need of each gas usage sub-objective may be counted. Temperature increase weight=(sum of the degree of need of the temperature increase sub-objectives)/(sum of the degree of need of each gas usage sub-objective). Emission reduction weight=(sum of the degree of need of the emission reduction sub-objectives)/(sum of the degree of need of each gas usage sub-objective). For the degree of need, please refer to FIG. 2 and related description thereof.

Based on the evaluation function provided by some embodiments of the present disclosure, the temperature increase objective completion evaluation value and the emission reduction objective completion evaluation value can be accurately evaluated, thereby improving accuracy of selecting the candidate proportioning feature, and thus improving accuracy of the target proportioning feature.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for controlling natural gas efficiency enhancement of smart gas, realized based on a smart gas Internet of Things (IoT) system, wherein the smart gas IoT system comprises a smart gas user platform, a smart gas service platform, a smart gas equipment management platform, a smart gas sensor network platform, and a smart gas object platform, the method is implemented by the smart gas equipment management platform and comprises:

obtaining at least one user need through the smart gas user platform based on the smart gas service platform, the user need including a gas consumption need and a gas usage target need;

determining at least one optimization objective based on the at least one user need, including
for each optimization objective of the at least one optimization objective, determining a user satisfaction degree of each user need of the at least one user need to the optimization objective;
determining a total satisfaction degree of the optimization objective according to each user satisfaction degree corresponding to the optimization objective; and
determining a final optimization objective according to the total satisfaction degree of each optimization objective;

determining a target proportioning feature of a synergist according to the at least one optimization objective, including
determining a constraint that the target proportioning feature satisfies according to the at least one optimization objective;
generating at least one candidate proportioning feature according to the constraint, the each candidate proportioning feature including a candidate proportioning vector and a candidate addition proportion of the synergist;
performing at least one round of iterative processing on the at least one candidate proportioning feature, and determining the candidate proportioning feature and an evaluation value after each round of iteration until the evaluation value satisfies the constraint; and
determining the candidate proportioning feature with the evaluation value satisfying the constraint as the target proportioning feature, the target proportioning feature including a proportioning vector and an addition proportion of the synergist; and configuring a target synergist that satisfies the target proportioning feature to enhance efficiency of natural gas by sending the target proportioning feature to the smart gas object platform through the smart gas sensor network platform.

2. The method of claim 1, wherein the determining a target proportioning feature of a synergist based on the at least one optimization objective includes:
determining the target proportioning feature according to the final optimization objective.

3. The method of claim 2, wherein the determining a total satisfaction degree of the optimization objective according to each user satisfaction degree corresponding to the optimization objective includes:
determining a weight of the user need; and
for each optimization objective of the at least one optimization objective, weighting each user satisfaction degree corresponding to the optimization objective according to the weight to determine the total satisfaction degree of the optimization objective.

4. The method of claim 2, wherein when the gas usage target need includes at least two gas usage sub-objectives, the determining a user satisfaction degree of each user need of the at least one user need to the optimization objective includes:
determining a degree of need of the each gas usage sub-objective according to the at least two gas usage sub-objectives;
for each optimization objective of the at least one optimization objective, determining a sub-user satisfaction degree of each gas usage sub-objective of the user need to the optimization objective; and
determining the user satisfaction degree of the user need to the optimization objective according to each sub-user satisfaction degree of the user need.

5. The method of claim 1, wherein in each round of iteration of the at least one round of iterative processing, the determining the candidate proportioning feature and an evaluation value after each round of iteration includes:
obtaining a candidate proportioning feature after a previous round of iteration;
determining a first candidate proportioning feature of a current round of iteration by performing a transform processing on the candidate proportioning feature after the previous round of iteration;
determining a current round evaluation value of the first candidate proportioning feature of the current round of iteration and a current round evaluation value of the candidate proportioning feature after the previous round of iteration according to the first candidate proportioning feature of the current round of iteration and the candidate proportioning feature after the previous round of iteration;
determining a candidate proportioning feature after the current round of iteration according to the current round evaluation value of the candidate proportioning feature after the previous round of iteration and the current round evaluation value of the first candidate proportioning feature of the current round of iteration; and
determining the evaluation value of the candidate proportioning feature after the current round of iteration according to the candidate proportioning feature after the current round of iteration.

6. The method of claim 1, wherein the determining the evaluation value of the candidate proportioning feature after the current round of iteration according to the candidate proportioning feature after the current round of iteration includes:
determining an objective completion evaluation value of the candidate proportioning feature after the current round of iteration through a preset evaluation function according to the constraint;

determining a clustering evaluation value of the candidate proportioning feature after the current round of iteration according to each candidate proportioning feature of the at least one of candidate proportioning feature after the current round of iteration; and determining the evaluation value of the candidate proportioning feature after the current round of iteration according to the objective completion evaluation value and the clustering evaluation value.

7. A non-transitory computer-readable storage medium storing computer instructions, wherein when the computer instructions are executed by a processor, the method of claim 1 is implemented.

8. A smart gas Internet of Things (IoT) system for controlling natural gas efficiency enhancement of smart gas comprising a smart gas user platform, a smart gas service platform, a smart gas equipment management platform, a smart gas sensor network platform, a smart gas sensor network platform, and a smart gas object platform, wherein the smart gas equipment management platform is configured to:

obtain at least one user need through the smart gas user platform based on the smart gas service platform, the user need including a gas consumption need and a gas usage target need;

determine at least one optimization objective based on the at least one user need, including for each optimization objective of the at least one optimization objective, determining a user satisfaction degree of each user need of the at least one user need to the optimization objective;

determining a total satisfaction degree of the optimization objective according to each user satisfaction degree corresponding to the optimization objective; and determining a final optimization objective according to the total satisfaction degree of each optimization objective;

determine a target proportioning feature of a synergist according to the at least one optimization objective, including determining a constraint that the target proportioning feature satisfies according to the at least one optimization objective;

generating at least one candidate proportioning feature according to the constraint, the each candidate proportioning feature including a candidate proportioning vector and a candidate addition proportion of the synergist;

performing at least one round of iterative processing on the at least one candidate proportioning feature, and determining the candidate proportioning feature and an evaluation value after each round of iteration until the evaluation value satisfies the constraint; and determining the candidate proportioning feature with the evaluation value satisfying the constraint as the target proportioning feature, the target proportioning feature including a proportioning vector and an addition proportion of the synergist; and configure a target synergist that satisfies the target proportioning feature to enhance the efficiency of natural gas by sending the target proportioning feature to the smart gas object platform through the smart gas sensor network platform.

* * * * *